Aug. 10, 1937.  A. J. MOTTLAU  2,089,807
CLUTCH SYSTEM
Filed March 16, 1932  3 Sheets-Sheet 1

INVENTOR
August J. Mottlau
by
his attorney

Aug. 10, 1937.  A. J. MOTTLAU  2,089,807
CLUTCH SYSTEM
Filed March 16, 1932  3 Sheets-Sheet 2
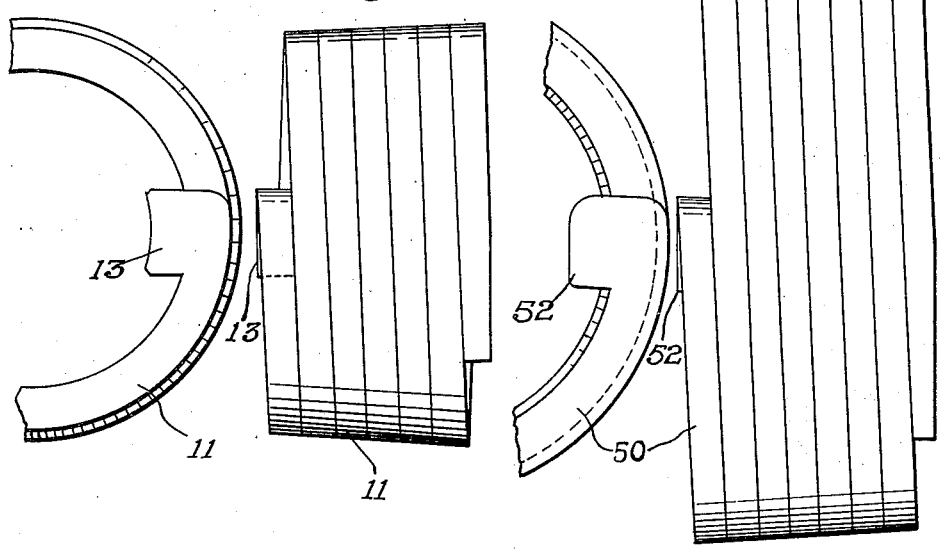
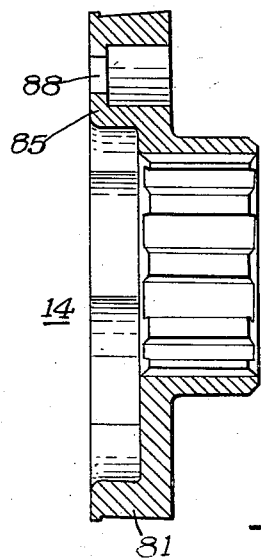
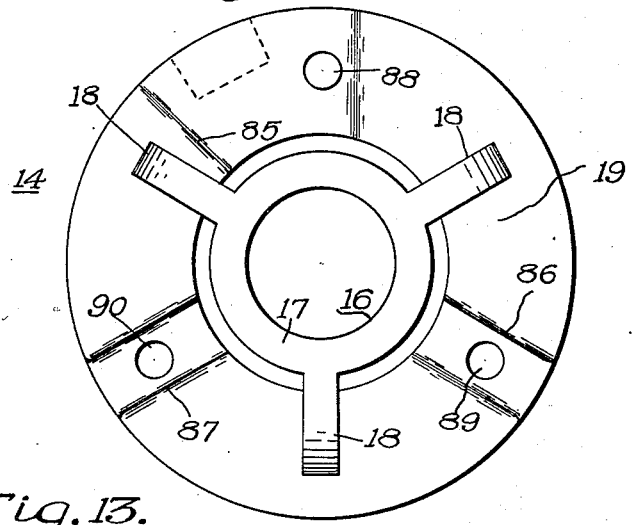
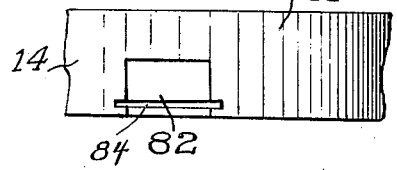
INVENTOR
August J. Mottlau
by
his attorney Aug. 10, 1937.　　　　A. J. MOTTLAU　　　　2,089,807
CLUTCH SYSTEM
Filed March 16, 1932　　　　3 Sheets-Sheet 3
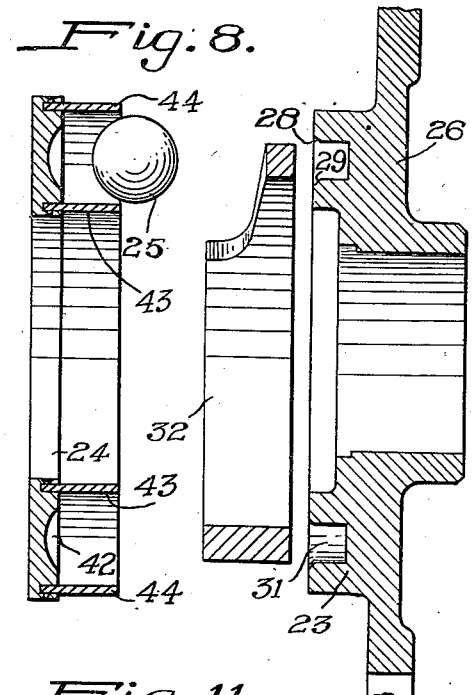
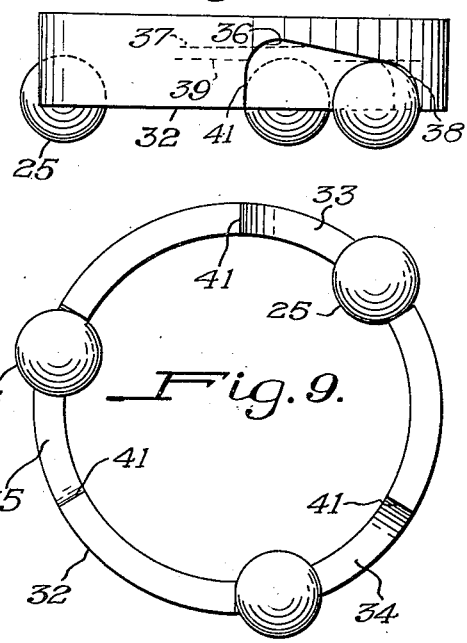
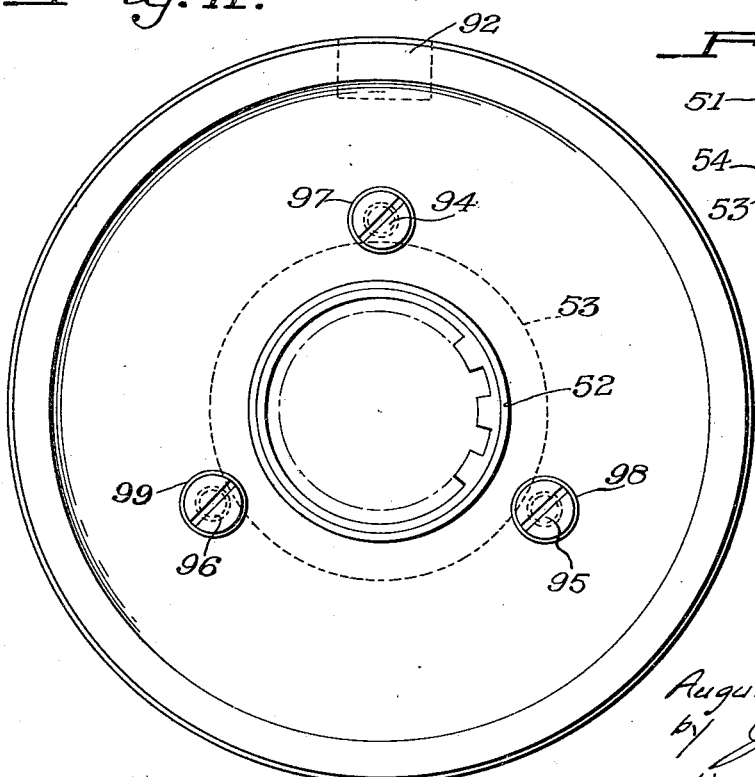
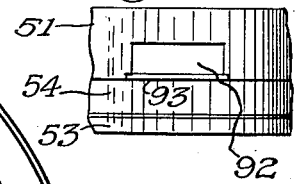
INVENTOR
August J. Mottlau
by J. B. Foster
his attorney Patented Aug. 10, 1937

2,089,807

UNITED STATES PATENT OFFICE 2,089,807

CLUTCH SYSTEM

August J. Mottlau, Pittsburgh, Pa., assignor, by direct and mesne assignments, to Julius E. Foster, Pittsburgh, Pa.

Application March 16, 1932, Serial No. 599,171

43 Claims. (Cl. 192—48)

This invention relates to clutches and clutch systems, and particularly to a clutch system for selectively controlling the connection between two rotatable shafts, as in the free-wheeling or conventional operation of an automotive vehicle.

One object of the invention is to provide a simple and rugged clutch assembly whereby a uni-directional clutching or driving operation may be established to permit over-running of a driven shaft with respect to a drive shaft, as in the free-wheeling of an automotive vehicle.

Another object of the invention is to provide a simple system whereby direct drive clutching action may be established in a vehicle, or between a drive shaft and a driven shaft when the drive shaft tends to actuate the driven shaft, at the time and under the conditions when the two shafts are substantially in synchronism, with the driving shaft tending to move faster than the driven shaft, and, therefore, to drive the driven shaft.

Another object of the invention is to provide a simple system for automatically coupling the drive shaft and the driven shaft in an automotive vehicle, or in any other machine, by establishing the automatic acceleration of the drive shaft until it attains the speed of the driven shaft, so that the clutching action may be established without shock while the two shafts are running at substantially synchronous speed.

Another object of the invention is to provide a synchronism responsive actuator for controlling the direct connection between the two shafts when they are rotating at substantially synchronous speeds so that such clutching action will not be attended by any shock to the driving system.

In order to permit the accumulated kinetic energy or momentum of an automotive vehicle to be utilized where such is possible and driving energy is not required, various free-wheeling devices or clutches have been provided to establish a uni-directional driving connection between the drive shaft of an automotive vehicle and the rear or propeller shaft. These devices function in such manner as to couple the drive shaft to the driven shaft when the drive shaft tends to rotate faster than the driven shaft and to transmit driving energy thereto. When the reverse condition occurs, and the driven shaft, due to the momentum of the vehicle tends to rotate faster than the drive shaft, the clutch device, due to its uni-directional characteristics, opens or breaks the driving connection between the drive shaft and the driven shaft to permit the driven shaft to "free-wheel" or rotate faster than the drive shaft in the normal forward direction.

When the drive shaft is again accelerated to operate the driven shaft, or the driven shaft returns to the same speed as the drive shaft, the clutch functions automatically to establish a direct driving connection between the drive shaft and the driven shaft, when, and just as soon as, the drive shaft reaches the speed of the driven shaft and tends to exceed it. The clutch functions immediately to connect the two shafts and driving energy is transmitted from the drive shaft to the driven shaft as a solid drive member.

When driving on a grade, or in hilly country, it is desirable to use the braking effort of the engine in addition to or instead of the normal braking system in order to prevent a too rapid descent of the automotive vehicle down a grade or incline. It is desirable, therefore, to be able to connect the engine or the drive shaft of an automotive vehicle to the propeller or driven shaft with maximum ease when the clutch system is set for free-wheeling. Under such conditions it is desirable that the transition from free-wheeling to conventional drive be made with maximum ease and minimum distraction of the operator in order that his attentions may otherwise be mainly directed to the control of the vehicle.

Ordinarily when an automotive vehicle is free-wheeling the engine is idling or running at a very low speed. To establish a direct coupling connection under such conditions would be to couple the drive shaft and the driven shaft while they were rotating at relatively widely separated speeds. As a result, a severe shock and stress would be imposed upon all of the various members in the driving system with possible damage to the mechanical parts and with the resulting discomfort to the driver of the automotive vehicle and would tend to distract his attention from the control at a time when his complete attention would be most needed.

In order to avoid such shock to the system and to the driver of the vehicle, it is therefore not only desirable but essential that the coupling or direct driving connection be established when the drive shaft and the driven shaft are moving at relatively synchronous speeds.

Present practice involves acceleration of the engine by the driver while "feeling" for a synchronous condition at which to mesh the coupling elements of a free-wheeling clutch assembly between the drive shaft and the driven shaft.

In the clutch assembly which I describe herein, as one modification embodying the various features of my invention, I provide a uni-directional clutch connection between the drive shaft and the driven shaft comprising a helical spring supported on and mechanically connected to one shaft as one clutch element, and a co-operating member, such as a sleeve, supported on and mechanically connected to the other shaft. The two clutch elements are so supported as to provide a certain amount of relatively free axial movement for their respective engagement and disengagement to clutch or to declutch the two shafts.

In order to control the clutching and the declutching operations, I provide a normal synchronism detector as an actuating device in the form of an end thrust bearing having one race arranged to move axially relative to the other race in response to the axial movement of the bearing balls on one or more cams, according to the direction of relative rotation of the two shafts. When the drive shaft tends to rotate faster and therefore ahead of the driven shaft, the balls move up onto the inclined surfaces of the cams in the end thrust bearing, and force the movable axial race of the end thrust bearing axially outward, and that axial movement is utilized to establish engagement between the two clutch elements to establish a driving connection between the drive shaft and the driven shaft.

When the reverse condition is established, that is, when the driven shaft tends to rotate faster than the drive shaft, the balls ride down off the inclined cams and rotate freely between the two races as an end thrust ball bearing. The cams are freely rotatable in one race of the end thrust bearing and serve as separators for the balls in addition to serving as inclined cams upon which the balls move up, depending, of course, upon the respective directions of rotation. Suitable biasing means are provided to normally tend to bias the two races of the end thrust bearing toward each other.

In order to establish a reverse driving connection between the driven shaft and the drive shaft to enable the driven shaft to transmit drive energy to the drive shaft, which could not be done through the free-wheeling connection, a second helical spring clutch element is provided on the drive shaft which is axially movable on the drive shaft to engage or to disengage the clutch element of the driven shaft. This reversing clutch connection is selectively controlled to establish either uni-directional driving connection through the free-wheeling clutch elements or bi-directional driving connection in combination with the other two clutch elements.

Other objects of the invention are therefore to provide a system including a synchronism-responsive, or direction-responsive device for detecting a synchronous condition and for controlling the connection between the drive shaft and the driven shaft without shock.

A clutch system operating in accordance with the principles of my invention and a clutch assembly of one construction embodying the various features of my invention are illustrated in the accompanying drawings, in which Figure 1 is a schematic general lay-out of the system as a whole and a vertical section of the clutch element assembly;

Figure 2 is an end elevation of a part of the helical spring constituting an element of the free-wheeling clutch;

Figure 3 is a side elevational view of the spring shown in part in Figure 2;

Figure 4 is an end elevational view of a part of the helical spring which is selectively operated to permit uni-directional operation or to establish bi-directional operation;

Figure 5 is a side elevational view of the outer helical spring shown in Figure 4;

Figure 6 is a vertical sectional view of a splined sliding ring for supporting the spring shown in Figures 2 and 3;

Figure 7 is a front elevational view of the splined supporting ring in Figure 6, and of a biassing spring washer associated therewith;

Figure 8 is an exploded sectional view of the combination bearing and synchronism detector;

Figure 9 is a plan view of the synchronizer ring of the bearing of Figure 8;

Figure 10 is a side elevational view of the ring in Figure 9;

Figure 11 is a front elevational view of the shifting ring for controlling the external helical spring of Figure 1;

Figure 12 is a plan view of a part of the shifting ring shown in Figure 11 to illustrate the location of a holding slot for the lug of the spring supported by the shifting ring of Figure 11;

Figure 13 is a similar view of a portion of the splined sliding ring in Figure 6 to show the location of the holding slot for receiving the lug on the inner spring that is supported on the sliding ring shown in Figure 6;

Figure 1:
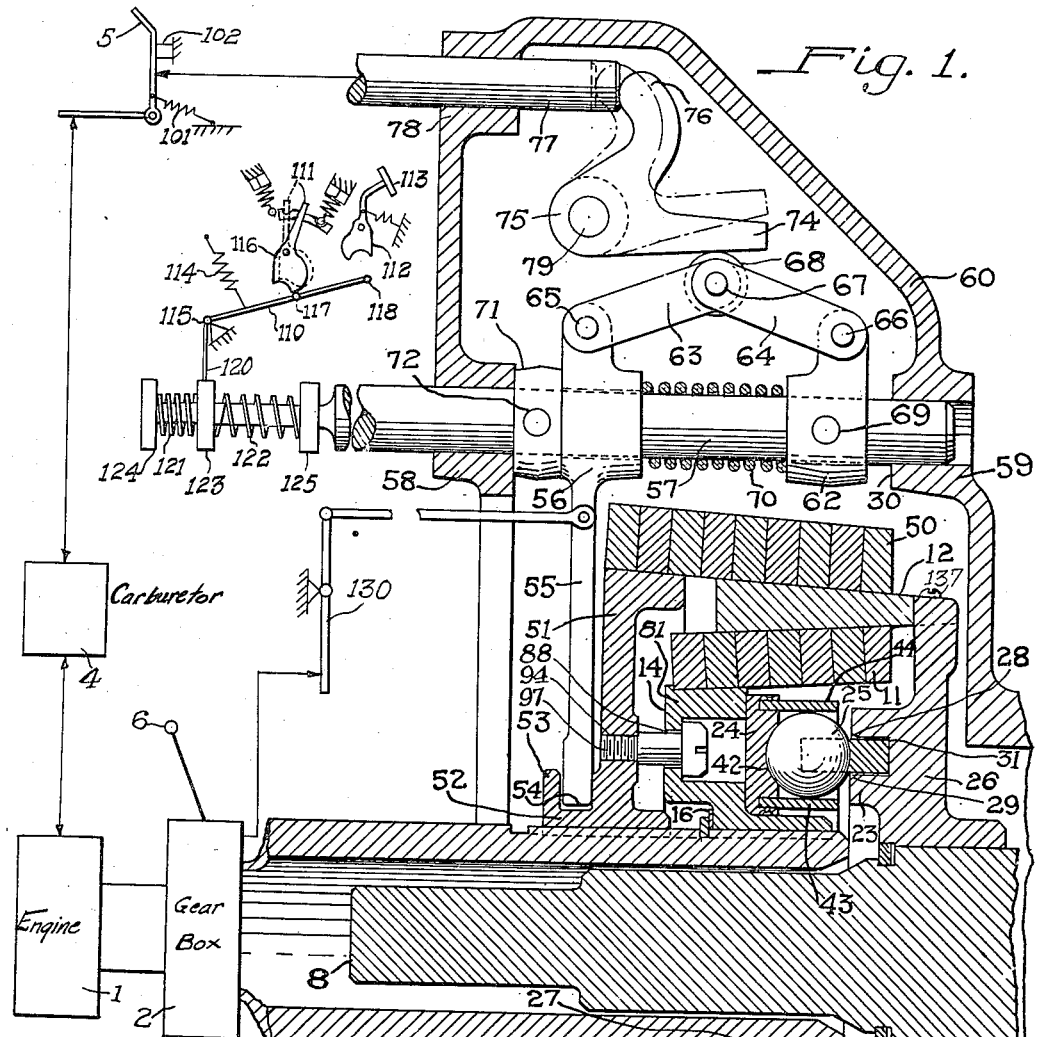
Figure 14:
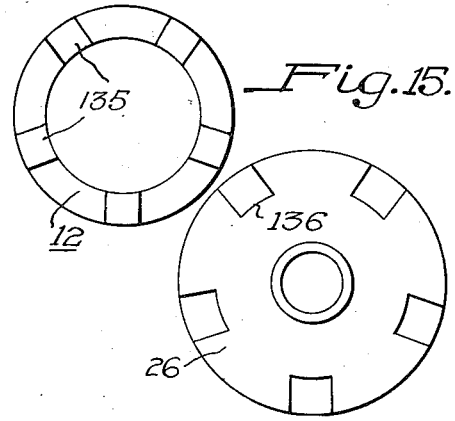
Figure 14 is an end elevational view of the sleeve clutch element 12 as viewed from the driven end at which it is secured to its supporting flange.
Figure 15:
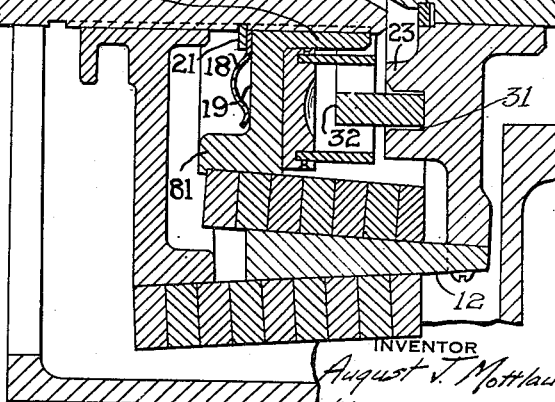
Figure 15 is a front elevational view of the supporting flange into which the sleeve is fitted that is shown in Figure 14.

As is shown in the drawings, and particularly in Figure 1, driving energy in an automotive vehicle is generated in an engine 1 and is transmitted through a gear box 2 to a drive shaft 3 extending from and connected to the driving gears or main shaft in the gear box, which are not illustrated here in detail since their construction is well understood. The operation of the engine is controlled by the usual carburetor 4 which supplies a controlled mixture of air and gasoline to the engine in proper proportions and according to the speed required, as indicated by the position of an accelerator pedal 5 controlled by the operator of the vehicle.

The gear box 2 is provided with the usual gear shift lever 6 by means of which the desired or required gear ratio may be established or inserted between the engine and the drive shaft 3 according to the ratio necessary to operate the vehicle.

The energy is supplied from the drive shaft 3 to the rear end of the vehicle through the usual propeller shaft (not shown) which is usually connected through a universal joint (not shown) to a driven shaft 8 illustrated here as being co-axially aligned with the drive shaft 3 and partially supported within the drive shaft 3 to have an additional bearing support without enlarging the length of the connection between the drive shaft and the driven shaft 8.

In order to provide a uni-directional or free-wheeling driving connection between the drive shaft 3 and the driven shaft 8 a clutch construction is provided embodying a uni-directional driving spring 11 arranged to be actuated by the drive shaft 3, and a co-operating driven sleeve 12 supported on and mechanically connected to an annular flange plate 26 anchored on the driven shaft 8.

The helical driving spring 11 is constructed as shown in Figures 1, 2 and 3, to be of substantially truncated cone shape, and is provided with an inwardly extending lug or finger 13 that is controlled by and supported on an annular supporting ring 14 that is splined to be axially but not rotatably movable on the drive shaft 3, to thereby establish a mechanical driving connection between the drive shaft 3 and the helical driving spring 11.

The splined supporting ring 14 serves, by its longitudinal or axial movement along the drive shaft 3, to engage the driving spring 11 and the driven sleeve 12, or to disengage those two elements, according to the position of the supporting ring 14. In this case the supporting ring 14 and the spring 11 are axially movable on drive shaft 3, but the sleeve 12 is fixedly secured to the driven shaft 8.

The movement of the supporting ring 14 with the driving spring 11 is controlled in one direction or the other in accordance with the direction of rotation of the drive shaft 3 with respect to the driven shaft 8. The movement of the ring 14 is established in one direction by a biassing spring 16 embodying a flat annular ring 17 and three resilient bent fingers 18 integral therewith that rest against the outer surface 19 of the supporting ring 14 and tend to move the ring in the right-hand direction. The biassing ring 16 is held in position against the supporting ring 14 by means of a snap ring 21 anchored in position on the drive shaft 3.

During free-wheeling operation, or movement of the driven shaft 8 faster than the drive shaft 3, the action of the clutch elements is such as to move the annular supporting ring 14 with the driving spring 11 towards the right-hand side to disengage the inner surface of the driven sleeve 12, thereby permitting the driven sleeve 12 to rotate freely, out of engagement with the drive spring 11.

As soon as the drive shaft 3 is accelerated, however, to a speed at which it just slightly exceeds the speed of the driven shaft, the supporting ring 14 is moved to place the driving spring 11 in engagement with the driven sleeve 12 to establish direct connection between the drive shaft 3 and the driven shaft 8. Such movement of the annular supporting ring 14 with the drive spring 11 is controlled by a synchronism detector which functions as an end thrust ball bearing for the annular supporting ring 14 during freewheeling operation, and functions to shift the clutch elements into engagement when substantially synchronous conditions are established, upon acceleration of the drive shaft 3 to a speed just slightly in excess of that of the driven shaft 8.

The synchronism detector comprises what may be considered two races 23 and 24 having three balls 25 disposed between them to co-operate with the two races to function as an end thrust ball bearing in one direction of rotation. The race 23 is illustrated in this modification as constituting an integral part of the annular web or flange 26 for the driven sleeve, and of course, is therefore fixed axially. The other race 24, however, is supported on a sleeve 27 integral with the supporting ring 14, and is therefore movable with the sleeve 14 as it shifts axially along the drive shaft 3. When the synchronism detector functions as an end thrust ball bearing, as during the free-wheeling operation, the balls 25 rest upon two spaced shoulders or runways 28 and 29 separated by a slot or channel 31 in the stationary race 26. The slot 31 is an annular slot as illustrated, and accommodates a synchronizing ring 32 disposed concentrically in the slot and arranged to be freely movable therein to rotate around its own axis which is concentric with the axes of the drive shaft 3 and of the driven shaft 8.

The synchronizing ring 32 is provided with three inclined cam surfaces 33, 34 and 35, that have an inclination starting from a low zone 36 below the locus of the lowest point of the balls, when they ride on the raceways 28 and 29 and function as an end thrust roller bearing, which locus is indicated by the dotted line 37. The taper or incline of the three cam surfaces extends from such low zones 36 gradually to a high point or zone 38 which places the lowermost points of the balls on a locus corresponding to the dotted line 39. The distance between the dotted line 37 and the dotted line 39 indicates the extent of the axial movement of the balls, and, consequently, the axial movement of the race 24 and the annular supporting ring 14 with the supported driving spring 11, when the direction of rotation of the balls is such as to cause them to ride up on the inclined surfaces of the synchronizer ring.

The operation of the synchronizer may be quite readily appreciated upon referring to the assembly as shown in Figure 1 and the detailed construction of the synchronizer elements as illustrated in Figures 8 to 11, inclusive. During freewheeling operation, the relative rotation between the two races 23 and 24 is such that the balls 25 roll in a direction toward the bottom points of the inclined surfaces 33, 34 and 35 and against vertical wall surfaces 41 rising from the lowermost point 36 of the cam surfaces. The balls will roll freely on the two spaced bevelled shoulders or raceways 28 and 29 and will move the ring 32 freely around in its slot 31 as a spacer or separator between the balls. During such operation the biassing spring 16 at the outer surface of the splined annular supporting ring 14 will force that annular supporting ring 14 and the race 24 towards the right-hand direction where the race 24 will engage, and ride freely upon, the rollers 25 as they roll around on the two shoulders or raceways 28 and 29 due to the relative backward rotation of the drive shaft 3 with respect to the driven shaft 8, during the freewheeling operation.

The race 24 is provided with a suitable curved groove 42 to accommodate the curvature of the balls 25. A pair of rings 43 and 44 are supported on and secured to the race 24 to retain the balls in position radially.

The operation of the free-wheeling clutch elements including the splined annular supporting ring 14, the driving spring 11 and the clutch sleeve 12, together with the synchronism detector just described, may now be considered. Normal forward driving rotation of the drive shaft is clockwise when viewed from the driving end and looking towards the driven shaft. Under such driving conditions the balls 25 are rotated in such direction as to revolve or turn in a clockwise direction that will cause the balls to ride up onto the inclined cam surfaces of the synchronizing ring 32. The race 24 will thereupon be forced axially away from the relatively stationary race 26, and it will move the annular splined supporting ring 14 with the driving spring 11 in the left-hand direction, until the spring 11 engages the inner surface of the sleeve 12.

As will be seen upon reference to Figures 1, 2 and 3, the inner spring 11 is wound in such direction that clockwise movement of the drive shaft 3, and, consequently, of the supporting ring 14, will tend to open or expand the drive spring 11 and cause it to effectively clutch the sleeve 12 to establish a driving connection between the drive shaft 3 and the driven shaft 8. Such driving connection will be established and maintained as long as the drive shaft 3 tends to rotate faster than the driven shaft 8 and to transmit energy thereto. During such driving connection, the end-thrust forces set up by the actuator, when the balls ride up on the inclined cam surfaces, are counterbalanced by the reaction forces of the clutch elements, spring 11 and sleeve 12.

As soon as conditions reverse and the driven shaft 8 tends to rotate faster than the drive shaft 3 due to de-energization of the engine and the release of the momentum of the vehicle, the drive spring 11 instantaneously releases its grip on the sleeve 12 so that the sleeve 12 is free to slide on the spring 11. Under such conditions this spring 11 tends to contract or reduce its diameter, thereby diminishing the contact friction between the spring 11 and the sleeve 12 to a minimum.

As soon as the grip between the spring 11 and the sleeve 12 is released so that the sleeve 12 may rotate freely with respect to the spring 11, the movements of the various parts of the synchronism detector, including the two races 24 and 26 and the balls 25, become such that the balls 25 roll down off the inclined surfaces of the synchronizer ring 32. As soon as such pressure of the balls upon the race 24 is withdrawn, the biassing spring 16 with its flexible fingers 18 becomes effective to force the splined supporting ring 14 and the race 24 towards the right hand direction, and, thereby, to disengage the driving spring 11 from the driven sleeve 12, if the setting of the clutch assembly is such as to permit free-wheeling operation. The explanation made so far presupposes that condition.

The remainder of the clutch assembly will now be considered that selectively predetermines whether free-wheeling or conventional drive shall obtain.

Since the clutching action between the drive spring 11 and the driven sleeve 12 is such as to permit clutching or driving connection only when the drive shaft 3 tends to drive the driven shaft 8, it is necessary to establish another connection, to be available when needed or desired, between the drive shaft 3 and the driven shaft 8, that will maintain a connection between the two shafts even when the driven shaft 8 transmits energy of momentum back to the drive shaft 3, or when the drive shaft is driven in a reverse direction. For this purpose an outer helical spring 50 is provided, as shown in Figures 1, 4 and 5, that is supported on, and shifted by, an annular shift ring 51 splined on and slidably supported on the drive shaft 3. The helical spring 50 is provided with an internally extending finger or lug 52 of the same character as is provided on the internal spring 11. The outer spring 50 is wound in the same direction as the inner spring 11 but the angle of inclination or taper is opposite, as is illustrated in Figure 1, to permit the two springs to engage the inner and the outer surfaces, respectively, of the sleeve 12, and to disengage those surfaces with maximum ease.

The shift ring 51 is provided with a central splined sleeve 52 that is splined sufficiently loosely with respect to the drive shaft 3 to permit free axial sliding movement of the sleeve 52 but not rotary movement.

The inner spring 11 acts radially in clutching and declutching the sleeve or cup 12. The outer spring 50 similarly acts radially in clutching and in declutching the sleeve 12. In addition, the outer spring 50 may be considered as consisting of a clutching portion that engages the cup 12, and of a yielding supporting portion that is mounted on the splined axially movable disc 51. The helical construction of the spring 50 provides a degree of resiliency and yieldability between the supporting portion of the spring 50 and the clutching portion thereof.

In order that the shift ring 51 may be shifted along the drive shaft, it is provided with a flange or collar 53, on the end of the sleeve 52, and spaced from the radial or flange wall of the ring 51, to provide a channel 54 for receiving a shifting lever or fork 55. The upper end of the shifting fork 55 is provided with a hollow boss 56 which is slidingly and loosely mounted on a supporting and positioning rod 57 that is axially movable between, and supported by, two bearings 58 and 59 in the casing 60 for the clutch assembly.

The boss 56 of the shift lever 55 as already mentioned, is loosely mounted and shiftable on the rod 57, and co-operates with an anchored lug 62 to control a toggle formed of two links 63 and 64, respectively supported and pivoted on the boss 56 at a point 65 and on the anchored lug 62 at a point 66. The other ends of the two links are pivotally joined by a pin 67 on which a roller 68 is also freely mounted. The anchored lug 62 is anchored on the rod 57 by means of a pin 69 and serves as a stop for a biassing spring 70 which tends to bias and separate the anchored lug 62 and the boss 56 of the shift lever or fork 55.

A stop ring 71 pinned to the rod 57 by means of a pin 72 serves as a back stop for the boss 56 of the shift lever 55 to limit the shifting movements of the lever 55 in response to the biassing action of the biassing spring 70.

During normal operation the two links 63 and 64 of the toggle are in their lowermost position with their end supports, namely, the boss 56 and the anchored lug 62, most widely separated. In that case the boss 56 rests against the back stop ring 71. When the rod 57 is moved to compress the biassing spring 70, as will be hereinafter explained, the length of the toggle is shortened and the pivoted roller 68 is raised against one arm 74 of a pivoted bell crank lever 75 to cause another arm 76 to move an accelerator rod 77 supported in a bearing 78 in the casing 60. The bell crank lever 75 is supported on a rocker rod 79 supported between opposite walls of the casing in any suitable manner.

When the bell crank lever 75 is moved upward to shift the accelerator rod 77 the engine is caused to speed up, as will be later explained. When the toggle is lengthed due to the separation of the anchored lug 62 and the boss 56 of the shift lever 55, the bell crank lever 75 resumes its normal lowermost position, as indicated in full line in Figure 1, under the influence of a suitable biassing spring 101 which is also utilized to normally bias the accelerator rod 77 to the position illustrated in solid line in Figure 1.

In order to explain more fully the inter-relationship between the drive spring 11 and the reverse spring 50, the lost motion mechanical connection between the annular supporting ring 14, for the driving spring 11, and the annular shift ring 51, for supporting the outer spring 50, will now be referred to.

The annular supporting ring 14 comprises, in addition to its splined sleeve 27 and its annular flange 19, a spring rest ring portion 81 encircling the flanged wall of the supporting ring 14 as a whole. The seating portion 81 is provided with a slot or recess 82 for receiving the internal finger or lug 13 of the internal driving spring 11 to establish a mechanical connection between the supporting annular ring 14 and the driving spring 11. The finger or lug 13 is then anchored in position in the slot 82 by a suitable locking bar 84 so that the lug 13 of the spring will not shift out of the slot during the reciprocating movement of the supporting ring 14.

The supporting ring 14 is also provided with three raised bosses 85, 86 and 87 provided with central openings 88, 89 and 90, respectively.

The annular shift ring 51, which also supports and actuates the outer reverse spring 50 is also provided with a slot 92 for receiving the driving finger or lug 52 on the outer or reverse spring 50. This lug is anchored in the slot 92 by any suitable means such as a bar 93 to prevent the driving lug from shifting out of the slot 92.

The annular shift ring 51 is also provided with three equi-distantly spaced threaded openings 94, 95 and 96 located and arranged to be in axial alignment with the holes 88, 89 and 90, respectively in the three bosses on the annular supporting ring 14 for the driving spring 11.

A lost motion connection is provided between the annular supporting ring 14 and the annular shift ring 51 by means of three bolts 97, 98 and 99, respectively, which extend through the openings 88, 89 and 90 in the annular supporting ring 14 and are threadedly anchored in the threaded holes 94, 95 and 96 in the shift ring 51.

With the lost motion connection as illustrated in Figure 1, the shift ring 51 may have a certain amount of free motion towards the right-hand direction with respect to the annular supporting ring 14 but its movement in the left-hand direction will depend upon the position of the annular ring 14. Conversely, the movement permitted to the annular supporting ring 14 and, consequently, the driving spring 11, will depend upon the position to which the shift ring 51 is selectively biassed according to the selected position of the selector rod 57, as disposed by the operator.

The various elements of an automotive vehicle, with which the clutch assembly described herein co-operates as a general system, are illustrated schematically in Figure 1, since their respective constructions and general modes of operation are well understood. For the purposes of the present operation they will be referred to briefly.

As shown in Figure 1, the engine 1, which operates through the gear box to actuate the drive shaft 3, is supplied with a mixture of gasoline and air according to the desires of the operator, as indicated by his control or actuation of an accelerator pedal 5. The accelerator pedal 5 is shown in its normal raised position to which it is normally biassed by a spring 101 which serves normally to hold the pedal 5 against a stationary back stop 102 suitably supported on a part of the stationary structure of the casing of the engine.

The accelerator rod 77 controlled by the clutch assembly is schematically illustrated as bearing against the accelerator pedal 5 in such manner that actuation of the accelerator rod 77 by the pivoted bell crank lever 75 will depress the accelerator pedal 5 to supply gas to the engine to cause the engine to speed up.

The control of the selector rod 57 by means of which the clutch is caused to operate as a free-wheeling or uni-directional device, or as a bi-directional connection is illustrated in simple schematic form as applied to the selector rod 57 which controls the movement of the shift lever 55.

In order to control the movement of the selector rod 57 a pivoted bell crank lever is provided having one arm 110 arranged to be operated by an operation selecting lever 111 to determine whether the clutch shall function as a uni-directional or as a bi-directional connection between the drive shaft and the driven shaft. Where it is desired to utilize the braking power of the engine each time the brake is operated a cam 112 is provided to engage the arm 110 in response to the actuation of a brake pedal 113, upon which the cam is mounted. For normal free-wheeling operation the arm 110 of the bell crank is biassed to its upper position, by a biassing spring 114, around a fixed rod or pivot 115. The operation selector lever 111 is pivotally supported to be movable to either of two positions, and is provided with a cam 116 by means of which it may force the arm 110 downward against the restraining action of the biassing spring 114 or it may permit the arm 110 to be moved to its upper position by the biassing spring 114, according to whether the projecting portion of the cam or the recessed portion of the cam 116 is caused to engage a pin or roller 117 on the arm 110.

The cam 112 controlled by the brake pedal 113 is similarly provided with a recessed portion for receiving a pin or roller 118 on the arm 110 if the operation selector lever 111 is also in position to permit its associated pin or roller 117 to move to its extreme upper position under the influence of the biassing spring 114. Assuming that condition to be so, the arm 110 may move to its upper position while the brake pedal is in its normal raised position. As soon as the brake pedal is depressed, however, to operate the braking system of the vehicle, the extended surface of the cam 112 will move the pin or roller 118 downward to cause the arm 110 to move downward around its pivot 115. Pivotal movement of the arm 110 will cause a corresponding pivotal movement of the other arm 120 integral therewith to control the movement of the operation selecting rod 57 according to the direction of movement of the arm 120 and its position.

The movement of the depending arm 120 of the bell crank is transmitted to the operation selector rod 57 through the medium of two helical springs 121 and 122. These two springs are normally under balanced compression and act upon opposite sides of a positioning ring 123 secured to the lower end of, and controlled by, the depending bell crank arm 120. Two flanges 124 and 125 constitute the back rests for the opposite and outer ends of the two springs, the inner ends being in engagement with, and subject to the movement of, the positioning ring 123.

The operation of the complete system may now be considered. The various parts of the mechanism are illustrated in the positions which they will occupy during normal operation, with a bi-directional connection established between the drive shaft 3 and the driven shaft 8 that is connected to the propeller shaft (not shown) at the rear end through the usual universal joint (not shown). The operation selector lever 111 is in the position for establishing conventional or bi-directional drive, and the bell crank arm 110 is in its lower position at which the arm 120 is moved to its extreme left hand position with the selector rod 57 in the position shown. Under the conditions as mentioned the driving spring 11 and the reverse spring 50 are both in engagement with the driven sleeve 12.

Forward driving rotation of the drive shaft 3 causes the drive spring 11 to tend to unwind or to enlarge its diameter, thereby gripping the sleeve 12 and establishing a positive forward driving connection between the spring 11 and the sleeve 12 to connect the drive shaft 3 to the driven shaft 8 and to transmit driving energy between them. If the accelerator is now released and the kinetic energy or momentum of the traveling vehicle tends to transfer itself from the driven shaft 8 to the drive shaft 3, such transfer of energy is made through the sleeve 12 and the reverse spring 50, which under such conditions tends to contract and to grip the sleeve 12, thereby establishing a positive driving connection between the sleeve 12 and the spring 50 as the two clutch elements, with energy transferred from the driven shaft to the drive shaft.

During such operation the shift ring 51 is held in the position illustrated, due to the biasing action of the compressed spring 121, which is greater than, and sufficient to over-balance, the opposing biasing action of the spring 16 resting against the outer surface 19 of the supporting ring 14 toward the inner spring.

The inner spring 11 thus functions to transmit energy from the drive shaft 3 to the driven shaft 8, and the outer reverse spring 50 functions to transmit energy from the driven shaft 8 to the drive shaft 3. Both springs thus function in co-operation with the sleeve 12 to establish bi-directional driving connection between the two shafts.

In order to establish free-wheeling operation, the selector lever 111 is moved to the position at which the pin 117 and the bell crank arm 110 may be moved upward in response to the biasing action of the spring 114. The arm 120 is thereupon caused to shift the positioning ring 123 to compress the spring 122, thereby establishing a biasing force on the positioning rod 57 which ultimately shifts the rod 57 in the right-hand direction to a limited position as controlled by the anchored stop lug 62 resting against the corresponding inner surface 30 of the bearing 59. The movement of the rod 57 in the right-hand direction carries the anchored ring 71 with it, and moves the shift lever 55 in the same direction which in turn moves the shift ring 51 and the reverse spring 50 also in the same direction towards the right-hand side. No compression force is imposed upon the biasing spring 70 that controls the toggle operation, since the stop ring 71 moves the boss 56 on the shift lever 55 with the rod 57 and does not disturb the relationship or distance between the boss 56 and the anchored lug 62. As long as the positioning rod 57 is now maintained in such extreme right-hand position, the reverse spring 50 is disengaged from the sleeve 12 and only the drive spring 11 is effective to function as a clutch element in co-operation with the sleeve 12.

The system is now set, therefore, to function as a free-wheeling system. When the drive shaft 3 tends to rotate faster than and to transmit energy to the driven shaft 8, the direction of rotation of the race 24 of the synchronizer bearing is such as to move the balls 25 up onto the inclined cam surfaces of the synchronizer ring 32, thereby forcing the race 24 and the supporting ring 14 with the inside driving spring 11 toward the left-hand direction. Such axial movement of these parts in the left-hand direction is established until the driving spring 11 engages the sleeve 12, whereupon a direct driving connection is established between the drive shaft 3 and the driven shaft 8, so that no further relative movement may take place between them, and, consequently, no further movement of the balls 25 upon the inclined surfaces of the synchronizer ring is permitted. The connection between the drive spring 11 and the sleeve 12 is maintained so long as the drive shaft 3 supplies driving energy to, and tends to rotate faster than, the driven shaft 8.

As soon as the supply of energy to the driven shaft 8 is terminated and the momentum of the vehicle is permitted to move the vehicle freely forward without the necessity of driving energy from the engine, the driven shaft 8 tends immediately to rotate faster than the drive shaft 3, as a result of which, the de-clutching action previously referred to takes place between the sleeve 12 and the drive spring 11 due to the tendency of the spring 11 to contract or diminish in diameter under such conditions. Simultaneously with such declutching action, which is practically instantaneous, the balls 25 of the synchronizer bearing move downward from the inclined cam surfaces of the synchronizer ring onto the raceways 28 and 29 of the race 23, and the biasing spring 16, by the pressure of its fingers 18 on the outer surface of the supporting ring 14, functions to move ring 14 and the spring 11, together with the race 24 to their extreme right-hand positions. The spring 11 is thereupon completely disengaged from the sleeve 12 which thereupon rotates freely without any frictional engagement with the clutch elements on the drive shaft 3. The only connection between the drive shaft 3 and the driven shaft 8 under such free-wheeling conditions is that established by the synchronizer bearing which functions during such free-wheeling operation as an end-thrust ball bearing, thereby introducing a minimum amount of frictional engagement between the drive shaft 3 and the driven shaft 8.

As soon as the accelerator pedal is depressed to again cause the engine to drive the vehicle, the balls of the synchronizer bearing again move in the direction that will shift the drive spring 11 into engagement with the sleeve 12.

Such action of alternate engagement and disengagement between spring 11 and sleeve 12 takes place continually so long as the operation of the system as a whole is pre-set to permit free-wheeling by means of the operation selector lever 111.

If it is now desired to establish a bi-directional driving connection between the drive shaft 3 and the driven shaft 8, the operation selector lever 111 is moved to its other position at which the bell crank arm 110 is moved downward and the positioning ring 123 on the arm 120 moves to its extreme left-hand position, thereby compressing spring 121 to establish a strong biassing force to move the selector rod 57 to its left-hand position. Let us assume that this transfer from free-wheeling to conventional drive is being made while the car is free-wheeling or coasting under its momentum.

During such free-wheeling conditions the driven shaft 8 will be rotating faster than the drive shaft 3. Consequently, the rollers 25 will be in their lowermost positions riding on their raceways 28 and 29, and both the race 24 and the supporting ring 14 with the driving spring 11 will be in their furthermost right-hand positions due to the biassing action of the spring 16. The shift ring 51 will consequently be held in its furthermost right-hand position due to the restraining action of the bolts 97, 98 and 99. The shifting lever 55 and the movable boss 56 will also be held in their extreme right-hand positions. Consequently, when the selector rod 57 is moved in the left-hand direction, the spring 70 is compressed, and the toggle composed of the arms 63 and 64 is shortened, thereby raising the roller 68 and with it the arm 74 of the pivoted bell crank lever 75. The bell crank lever 75 in turn moves the rod 77 to depress the accelerator pedal 5, thereby supplying more gas to the engine 1 and causing the engine to accelerate to a greater speed.

As soon as the speed of the engine accelerates the drive shaft 3, as controlled by the position of the gears in the gear box to a speed equal to that of the driven shaft 8, so that the two shafts are in synchronism, the balls 25 of the synchronizer bearing will be stationary and will be immediately ready to change their direction of rotation, from normal ball-bearing rotation to rotation in the opposite direction under the influence of the accelerating drive shaft 3. As soon as the drive shaft accelerates but slightly ahead of the driven shaft 8, the balls 25 immediately move up onto the cam surfaces of the synchronizer ring and establish the driving connection between the drive spring 11 and the sleeve 12, as has already been previously explained.

It will be observed that the angle through which the balls move in riding up onto the inclined surfaces is of the order of about forty-five degrees, as illustrated herein. The drive shaft 3 thus advances only about one-eighth of a revolution beyond the driven shaft 8 by the time the clutching action is established between the drive spring 11 and the sleeve 12. Since both shafts are thus in substantial synchronism, no shock is imposed upon the system nor is any inconvenience caused to the occupants of the vehicle.

It will be remembered that during this operation the engine has been automatically accelerated due to the shortening of the toggle consisting of the two links 63 and 64.

As soon as the clutching action is established by reason of the balls 25 rolling up on the inclined surfaces and forcing the race 24 and the supporting ring 14 towards the left-hand direction, the biassing action of the spring 16 is of course overcome, and the shift ring 51 which supports the outer reverse spring 50 together with the shift lever 55 are then free to move a corresponding distance towards the left-hand side due to the lost motion connection of the bolts 97, 98 and 99. Such movement is immediately established by the biassing spring 70 until the boss 56 of the shift lever 55 is forced against the stop ring 71. With the establishment of such movement the toggle is again lengthened and the roller 68 is lowered to permit the accelerator rod 77 to be moved back into its normal position by means of the biassing spring 101 connected to the accelerator pedal 5.

The engine is thereupon immediately and automatically deenergized to its minimum idling condition, according to the adjustment of the carburetor.

The reverse spring 50 is now caused to engage the sleeve 12 and the energy of momentum of the vehicle is transmitted from the driven shaft 5 through the sleeve 12 and the reverse spring 50 to the drive shaft 3, and thence to the engine which in its minimum energized condition serves and functions as a brake to retard the vehicle.

Where such retarding action of the engine is desired each time the brake pedal is depressed, the cam 112 may be employed to be actuated by the usual brake pedal 113. Where such operation is not desired, the cam 112 is not employed.

When the vehicle is to be reversed it is necessary to establish a bi-directional connection between the drive shaft 3 and the driven shaft 8. If the clutch system is already pre-set for bi-directional operation, that condition is taken care of. If, however, the clutch mechanism is set for free-wheeling operation, the movement of the gear lever 6 to reversing position, is utilized to actuate a pivoted lever 130 to operate the shift lever 55 and move the reverse spring 50 into engagement with the sleeve 12. When the gear lever is moved from reverse position, the system readjusts itself to the pre-set condition.

In order to provide for greater ease of assembly the connection of the driven sleeve 12 to the flange plate 26 anchored on the driven shaft 8 is established by means of a dovetail connection. For that purpose the end of the sleeve 12 is provided with several equi-distantly spaced tongues or extensions 135 which fit into correspondingly spaced and properly sized radial slots 136 in the annular flange plate 26 secured to the driven shaft 8. After the unit is assembled, the sleeve 12 is secured to the flange plate by suitable locking elements such as pins or bolts 137.

With the arrangement and provision of the clutch elements as illustrated, uni-directional or bi-directional connection may be selectively established between the drive shaft and the driven shaft. By means of the selective action provided by the synchronizer bearing, the connection between the two shafts is established at a time when they are substantially in synchronism so that the clutching or connecting action between the two shafts is established without any shock upon the system. By also providing an arrangement whereby the drive shaft may be accelerated to such substantial synchronism, if it is desired to establish a bi-directional connection when the driven shaft is free-wheeling or over-running the drive shaft, the two shafts may be easily coupled without shock, and the subsequent release of the accelerating means then permits the engine to function as a brake to retard the vehicle. Such connection may be established irrespective of the position of the gear shift lever during forward motion.

My invention is not limited to the specific details nor to the specific arrangement of those details as illustrated in the accompanying drawings since they may be variously modified or disposed without departing from the spirit and scope of the invention as set forth in the appended claims.

I claim as my invention:

1. The combination with a drive shaft and a driven shaft, adapted to be independently or jointly rotated, of means for mechanically connecting or disconnecting the two shafts, and a uni-directional ball bearing for controlling the connecting means according to the relative speeds and directions of rotation of the two shafts, said ball bearing comprising anti-friction elements arranged for free continuous rolling motion in a circular path in a selected direction of rotation.

2. The combination with two shafts, independently actuable and relatively rotatable, of clutch means between the two shafts including a uni-directional driving clutch for forward driving motion, a second clutch for backward driving motion, and a uni-directional ball bearing for controlling the operation of the second clutch.

3. The combination with two shafts, independently actuable and relatively rotatable, of means for mechanically connecting the two shafts, and means responsive to the relative speeds and direction of rotation of the two shafts for controlling the connecting means, said speed responsive means comprising anti-friction elements serving as an end thrust bearing and free to roll in a continuous circular path while one shaft rotates faster than the other and serving as a synchronism detector to actuate the connecting means when the speeds are substantially synchronous.

4. A coupling comprising a drive member, a driven member co-axially aligned, clutch elements on each member co-axially and relatively movable, and a uni-directional end thrust anti-friction bearing with anti-friction elements free to roll in a continuous circular path for controlling the engagement or disengagement of the clutch elements.

5. The combination with two co-axially aligned shafts, and a clutch member on each shaft with relative axial movement possible between the clutch members, of an end thrust ball bearing between the two shafts and a movable cam travelling with but mechanically independent of the bearing balls at sub-synchronous speed of one shaft and operative to control the balls at synchronous driving speeds to establish operative engagement between the clutch members.

6. A clutch system comprising a drive member, a driven member, a sleeve connected to the driven member to constitute a clutch element, two reversely effective uni-directional clutch elements on the drive shaft to co-operate with the sleeve to selectively establish uni-directional or bi-directional connections between the clutch elements, and a uni-directional bearing for controlling the connection of one of the uni-directional clutch elements to the sleeve in accordance with synchronous conditions between the drive and the driven members.

7. A clutch system comprising a drive member, a driven member co-axially disposed, a clutch element on the driven member, two uni-directional reversely effective clutch elements on the drive member, said uni-directional clutch elements being axially movable relative to the driven clutch element and to each other, and a lost-motion connection between the two uni-directional clutch elements to permit them to be controlled individually or jointly.

8. A clutch system comprising a drive member, a driven member co-axially disposed, a clutch element on the driven member, two uni-directional reversely effective clutch elements on the drive member, said uni-directional clutch elements being axially movable relative to the driven clutch element and to each other, a lost-motion connection between the two uni-directional clutch elements, and means for selectively controlling them to function individually or jointly.

9. A clutch system comprising a drive shaft, a driven shaft co-axial therewith, a clutch element on one shaft, a co-operating clutch element on the other shaft, means for pre-setting a biassing force tending to cause the clutch elements to operatively engage, and means for counter-acting the biassing force until the two shafts are substantially synchronous, said counter-acting means including anti-friction bearing elements arranged to have free rolling motion in a continuous circular path to serve as an anti-friction bearing while the two shafts are not synchronous and are approaching synchronism.

10. A clutch system comprising a drive shaft, a driven shaft co-axially aligned, a clutch element on the driven shaft, a uni-directional clutch element on the drive shaft for forward actuation of the driven shaft, a clutch element on the drive shaft for reverse actuation of the driven shaft, and a rolling element responsive to relative rotation of the two shafts for controlling the individual or joint operation of the forward and the reverse clutch elements.

11. A clutch system comprising a drive shaft, a driven shaft, a sleeve serving as a clutch element connected to one shaft, a spring within the sleeve and connected to the second shaft to permit selective and automatic uni-directional driving action between the two shafts, a clutch element on the second shaft axially movable to engage the outer surface of the sleeve to permit driving action in a reverse direction relative to the spring driving direction and means for preventing the axial movement of said outer clutch element to engage the sleeve until the two shafts are substantially synchronous.

12. In an automobile transmission, the combination with a drive shaft, a driven shaft, a driven clutch element on the driven shaft, and a driving clutch element splined on the drive shaft and axially movable thereon, of lever-controlled means for separating the clutch elements and for then holding them separated during sub-synchronous speed of the drive shaft, and means including a uni-directional roller and cam assembly for controlling the said lever means to permit the clutch elements to engage at synchronous speed.

13. In an automobile transmission, the combination with a drive shaft, a driven shaft, a driven clutch element on the driven shaft, and a driving clutch element splined on the drive shaft and axially movable thereon, of lever-controlled means for separating the clutch elements and for then holding them separated during sub-synchronous speed of the drive shaft, a unidirectional roller and cam assembly disposed concentrically with the two shafts and arranged to function according to the relative speeds of the two shafts, and means axially movable, when the rollers move onto the cams, and serving to control the holding means to permit the clutch elements to engage at synchronous speed.

14. A clutch system comprising a drive shaft, a driven shaft, a sleeve serving as a clutch element connected to one shaft, a spring within the sleeve and connected to the second shaft to permit uni-directional driving action between the two shafts, and means including a uni-directional ball bearing with anti-friction elements free to roll in a continuous path, said means being responsive to a condition of substantial synchronism between the two shafts for establishing driving engagement between the spring and the sleeve.

15. A clutch system comprising a drive shaft, a driven shaft, a sleeve connected to the driven shaft to constitute a clutch element, two clutch elements on the drive shaft to co-operate with the sleeve to selectively establish uni-directional or bi-directional connections between the clutch elements, and a uni-directional device for controlling the connection of one of the clutch elements to the sleeve in accordance with synchronous conditions between the drive shaft and the driven shaft.

16. A clutch system comprising a drive shaft, a driven shaft co-axially aligned, a clutch element on the driven shaft, a uni-directional clutch element on the drive shaft for forward actuation of the driven shaft, a second clutch element on the drive shaft for reverse actuation of the driven shaft, said clutch element being normally radially spaced from the driven clutch element and embodying a clutching portion and a portion serving as a yielding support, and said clutch element being effective radially to clutch the driven clutch element, and a lost motion device, operative, when the device is set for uni-directional operation, to control the movement of the said second clutch element to engage the driven shaft clutch element.

17. A coupling comprising a drive member, a driven member co-axially aligned, a clutch element on each member, both clutch elements being co-axially and relatively movable; a biasing spring normally tending to separate the clutch elements, a ball bearing serving as an end thrust bearing for one clutch element during relative rotary movement between the clutch elements and their supporting members, and means responsive to the balls, when they move in a direction indicating synchronous driving speed, for counter-acting the biassing spring and urging the clutch elements into engagement.

18. A clutch for use in the drive connection of an automotive vehicle, comprising two co-operating frictional clutch elements axially movable, a biassing spring therefor, an annular pressure element rotatable with and mechanically related to one clutch element and operative to act against the biassing spring, and means for controlling the pressure element, said means including a lever actuable by the operator and an axial cam-and-roller actuator, the lever and the actuator being independently or jointly effective in actuating the pressure element.

19. The combination with two co-axially aligned shafts, a clutch member on each shaft with relative axial movement possible between the clutch members, and a biassing spring for inducing such relative axial movement of the clutch members in one direction, of an actuator comprising a floating assembly of a cam ring and co-operating anti-friction elements for counter-balancing the biassing spring and establishing relative axial movement in the opposite direction, the actuator being disposed to counterbalance the reaction forces of the clutch members.

20. The combination with two co-axially aligned shafts, a clutch member on each shaft with relative axial movement possible between the clutch members, and a biassing spring for establishing relative axial movement of the clutch members in one direction, of a uni-directional actuator comprising a floating assembly of a cam ring and cooperating anti-friction elements for establishing axial movement of the clutch members in the other direction, and means supporting the actuator and the clutch elements to counter-balance end thrusts of the actuator against the clutch elements.

21. In an automotive vehicle, the combination with a drive shaft, a driven shaft and a uni-directional clutch connecting the two shafts, of means to preset the clutch to operate automatically and selectively to establish uni-directional driving connections, means for connecting the two shafts to establish a driving connection to by-pass the uni-directional clutch, said connecting means consisting of one clutch element on one shaft, a second clutch element connected to the other shaft and embodying a clutching portion and a portion serving as a yielding support for said clutching portion, said clutch elements of the connecting means being normally radially separated and relatively rotatable within a clutching zone, and being effective radially to establish a clutching action within said zone, and means for controlling said by-passing means according to a synchronous relation between relatively moving co-operating parts of said controlling means.

22. In an automotive vehicle, the combination with a drive shaft, a driven shaft, and a unidirectional clutch selectively and automatically operative to connect, disconnect, and reconnect the two shafts, of means for selectively presetting the clutch to be operative or non-operative, separate connecting means between the two shafts, said connecting means consisting of one clutch element on one shaft, a second clutch element connected to the other shaft and embodying a clutching portion and a portion serving as a yielding support for said clutching portion, said clutch elements of the connecting means being normally radially separated and relatively rotatable within a clutching zone, and being effective radially to establish a clutching action within said zone, and means responsive to the uni-directional clutch at driving and connecting position for controlling the separate connecting means.

23. In an automotive vehicle, the combination with a drive shaft, a driven shaft, a uni-directional clutch selectively and automatically operative to connect, disconnect, and reconnect the two shafts, of means for selectively presetting the clutch to be operative or non-operative, separate connecting means between the two shafts, said connecting means consisting of one clutch element on one shaft, a second clutch element connected to the other shaft and embodying a clutching portion and a portion serving as a yielding support for said clutching portion, said clutch elements of the connecting means being normally radially separated and relatively rotatable within a clutching zone, and being effective radially to establish a clutching action within said zone, and means controlled by the uni-directional clutch for controlling the separate connecting means.

24. In an automotive vehicle, the combination with a drive shaft, a driven shaft, and a uni-directional clutch selectively and automatically operative to connect, disconnect, and reconnect the two shafts, of means for selectively presetting the clutch to be operative or non-operative, separate connecting means between the two shafts, said connecting means consisting of one clutch element on one shaft, a second clutch element connected to the other shaft and embodying a clutching portion and a portion serving as a yielding support for said clutching portion, said clutch elements of the connecting means being normally radially separated and relatively rotatable within a clutching zone, and being effective radially to establish a clutching action within said zone, and means responsive to predetermined movement of the uni-directional clutch for controlling the separate connecting means.

25. In an automotive vehicle, the combination with a drive shaft and a driven shaft; of uni-directional means for connecting the drive shaft and the driven shaft for power drive; means to establish a connection between the two shafts to bridge the uni-directional connection, said means including an element of said uni-directional means, said element being connected to the driven shaft, a member mechanically connected to and driven by the drive shaft, and a clutch element yieldingly supported and mounted on said member mechanically connected to the drive shaft, said clutch element also being radially effective to clutch said element of said uni-directional means during clutching intervals, said clutch element being normally radially spaced from, and rotatably movable relative to, the element of said uni-directional means in substantially the clutching zone; means operative by and at the will of the vehicle operator for selectively permitting an automatic changeover from uni-directional to bi-directional connection; and means for automatically assuring synchronous conditions between the two shafts before the bi-directional connecting means between the two shafts may be made effective to connect the two shafts, when free wheeling operation is to be terminated and bi-directional driving operation established.

26. The combination with a drive shaft, a driven shaft, and a uni-directional clutch between them; means for pre-setting the clutch to operate automatically and selectively to provide a uni-directional driving connection; separate connecting means between the two shafts, said connecting means consisting of a clutch element on one shaft, a clutch element connected to the other shaft and embodying a clutching portion and a portion serving as a yielding support for the clutching portion, said clutch element of the connecting means being normally radially separated and relatively rotatable within a clutching zone, and being effective radially to establish a clutching action within said zone; and means responsive to movement of an element of the uni-directional clutch, said responsive means serving also as a synchronism detector to control the connecting means.

27. The combination with a drive shaft, a driven shaft, and a uni-directional clutch between the two shafts for automatically and selectively connecting the two shafts to establish a power driving connection; of means for selectively controlling the uni-directional clutch to permit it to function or to prevent it from functioning, said means including separate means co-operative with an element of the uni-directional clutch to connect the two shafts bi-directionally, said separate means comprising a member mechanically connected to and driven by the drive shaft, and a clutch element yieldingly supported and mounted on said member connected to and driven by the drive shaft, said yieldingly supported clutch element being radially effective to clutch said uni-directional element during clutching intervals, said clutch element being normally radially spaced from, and rotatably movable relative to the uni-directional element in substantially the clutching zone; and said separate means being automatically responsive to a synchronous condition in the mechanical circuit of said separate connecting means for controlling the establishment of the circuit connection by said separate connecting means.

28. A clutch system comprising a drive shaft; a driven shaft co-axial therewith; a clutch element on the driven shaft; and clutch elements on the drive shaft co-operative with the driven clutch element to selectively and automatically establish uni-directional power driving connections between the two shafts or to establish bi-directional power driving connections between the two shafts, said clutch elements which establish the uni-directional power driving connections between the two shafts being operative and functioning automatically to connect the two shafts for power drive; means for selectively presetting the clutch elements to permit them to function to establish such selective uni-directional operation, including biassing means, and means for operating the biassing means to establish a force to tend to cause the clutch elements to operatively engage to establish bi-directional driving connections between the two shafts, the co-operating clutch elements that are to establish bi-directional connections between the two shafts being radialy effective during clutching intervals and being radially spaced to be relatively rotatably movable in the clutching zone during non-clutching intervals, thereby to render the clutch elements readily operative independently of various relative angular positions attained during operation; and means responsive to synchronous conditions, between the clutch elements that are to establish bi-directional connections, for counteracting the biassing force until such clutch elements are substantially synchronous.

29. The combination with a drive shaft and a driven shaft; of a uni-directional clutch for connecting the two shafts to establish a power drive; means for connecting the two shafts bi-directionally, including an element of the uni-directional clutch connected to one shaft, and an element mechanically connected to the other shaft, said latter element being radially effective to establish clutching action with the co-operating element of the uni-directional clutch, thereby to render said latter element of the other shaft freely rotatable within the clutching zone relative to the co-operating uni-directional clutch element; means for inducing a bi-directional connecting operation of the connecting means; biassing means for controlling the operation of said inducing means; and means controlled by the uni-directional clutch for restraining radial clutching action by the connecting means until synchronous conditions are attained in the circuit of the connecting means.

30. In an automotive vehicle, the combination with a drive shaft emanating from the usual gear transmission; and a driven shaft connected to the driving wheels of the vehicle; of self-releasing connecting means operative radially to connect and to disconnect the two shafts; separate radially operative means to connect the two shafts by bridging said self-releasing means; and means responsive to synchronous conditions in the bridging connection for controlling the completion of the connection by such bridging means.

31. In an automotive vehicle, the combination with a drive shaft emanating from the usual gear transmission; and a driven shaft connected to the driving wheels of the vehicle; of a first self-releasing connecting means operative radially to connect and to disconnect the two shafts; separate self-releasing connecting means including radially effective cotrol spring means to connect the two shafts by bridging said first connecting means; and means responsive to synchronous conditions in the bridging connection for controlling the completion of the connection by such bridging connecting means.

32. In an automotive vehicle, the combination with a drive shaft emanating from the usual gear transmission; and a driven shaft connected to the driving wheels of the vehicle; of self-releasing connecting means operative radially to connect and to disconnect the two shafts; separate radially effective means to connect the two shafts by bridging said self-releasing means, and embodying a clutching portion and a portion serving as a yielding support for the clutching portion; and means responsive to synchronous conditions in the bridging connection for controlling the completion of the connection by such bridging means.

33. In an automotive vehicle, the combination with a drive shaft emanating from the usual gear transmission; and a driven shaft connected to the driving wheels of the vehicle; of self-releasing connecting means operative radially to connect and to disconnect the two shafts; and separate radially operative means to connect the two shafts by bridging said self-releasing means, including automatic means to detect synchronous conditions, and to operate automatically at such synchronous conditions to complete the bridging connection.

34. In combination in an automotive vehicle, a drive shaft; a driven shaft; a clutch element consisting of a cylinder cup secured to the driven shaft; a clutch element, on the drive shaft, disposed within the cup and radially effective to clutch and to declutch the cylinder cup within a predetermined annular clutching zone, and relatively rotatable in said zone when declutched; and means for establishing a by-passing connection around said clutch and between the two shafts, said means including means for radially clutching and declutching the cup in a second predetermined annular clutching zone, said means being relatively rotatable in said zone when declutched; and means responsive to synchronous conditions in the by-passing connection for controlling the completion of such connection by said by-passing means.

35. In combination in an automotive vehicle, a drive shaft; a driven shaft; a clutch element consisting of a cylinder cup secured to the driven shaft; a clutch element, on the drive shaft, disposed within the cup and radially effective to clutch and to declutch the cylinder cup within a predetermined annular clutching zone, and relatively rotatable in said zone when declutched; and means for establishing a by-passing connection around said clutch and between the two shafts, said means including a yieldingly supported element operative to radially clutch and declutch the cup in a second predetermined annular clutching zone, and means responsive to synchronous conditions in said by-passing connection and co-operative with said yieldingly supported element to control the completion of the by-passing connection by said by-passing means.

36. In combination in an automotive vehicle, a drive shaft; a driven shaft; a clutch element consisting of a cylinder cup secured to the driven shaft; a clutch element, on the drive shaft, disposed within the cup and radially effective to clutch and to declutch the cylinder cup within a predetermined annular clutching zone, and relatively rotatable in said zone when declutched; and means for establishing a by-passing connection around said clutch and between the two shafts, said means including a yieldable radially movable element operative radially to clutch and to declutch the cup in a second predetermined annular clutching zone; and means responsive to synchronous conditions in the circuit of the by-passing connection for controlling the completion of the connection by the by-passing means.

37. In combination, a drive shaft; a driven shaft co-axially aligned; a driven clutch element on the driven shaft; a first clutch element on the drive shaft radially effective to establish one connection to the driven shaft; a second clutch element on the drive shaft radially effective to establish a second connection to the driven shaft; a first actuating means to actuate the first clutch element to establish a radial clutching connection to the driven clutch element; a second actuating means to actuate the second clutch element to establish a radial clutching connection to the driven clutch element; spring biassing means constantly and positively energized and disposed to normally induce the first means to one predetermined position, and to normally induce the second means to a position at which the second means will hold the second clutch element radially disengaged from the driven clutch element; a lost-motion connection between the first means and the second means, said lost-motion connection permitting movement of the first means and the second means toward each other but limiting their distance of separation, whereby the second means may move to its connection-effecting position, against the force of the biassing spring means, only if and when the first connecting means has moved to a predetermined position; and means driven by the drive shaft, and co-operating with the driven clutch element and the second drive clutch element to control the second actuating means to establish the second connection under synchronous conditions.

38. In an automotive vehicle, the combination with a drive shaft; a driven shaft; and a uni-directional clutch between the two shafts and operative throughout the normal driving speed range of the drive shaft to connect and to disconnect the two shafts; of means operative at the will of the vehicle operator to render the clutch non-effective, said means including relatively movable co-operative parts respectively mechanically connected to each of the shafts and operative to connect the two shafts to establish a driving connection to by-pass the uni-directional clutch, said co-operating parts being effective radially to clutch and to declutch and being relatively rotatably movable within the clutching zone; and means responsive to a synchronous relation between the relatively moving co-operating parts of said by-passing connecting means for controlling the connection of said relatively moving parts.

39. In combination in an automotive vehicle, a drive shaft; a driven shaft; self-releasing means for connecting the two shafts throughout the normal driving speed range of the drive shaft; second connecting means operative to bridge the self-releasing means and to connect the two shafts to transmit energy between them, said second means including a first clutch element connected to one shaft, a second clutch element connected to the other shaft and radially operative to clutch the first clutch element, said second clutch element embodying a clutching portion and a portion serving as a yielding support therefor; and automatic means responsive to the relative speeds of two cooperative parts of the bridging connecting means for controlling the completion of the connection of the bridging means.

40. In combination, a drive shaft; a driven shaft; a driven clutch element on the driven shaft; a first clutch element on the drive shaft; a second clutch element on the drive shaft, including a radially effective clutching portion, and a supporting portion therefor, said second clutch element being effective to clutch the driven clutch element during clutching intervals, and being radially spaced from the driven clutch element during non-clutching intervals, to permit relative rotation within the clutching zone during such non-clutching intervals; biassing spring means normally constantly energized and disposed to bias the first drive clutch element to one position relative to the driven clutch element and to bias the second clutch element to open position radially relative to the driven clutch element; a lost-motion connection between the first and the second clutch elements to permit independent movement of the first clutch element while the second clutch element is not effective, but to permit movement of the second clutch element to effective clutching position only when the first clutch element has moved to a predetermined position against the force of the biassing spring means; and means including means driven by the driven shaft and co-operative with an element on the drive shaft for overcoming the force of the biassing spring means and for establishing a radially effective connection between the driven clutch element and the second drive clutch element under synchronous conditions.

41. In combination in an automotive vehicle, a drive shaft; a driven shaft co-axial therewith; a clutch element consisting of a cylinder cup secured to the driven shaft; a clutch element on the drive shaft and disposed to clutch the inside of the cup for power drive; and means for establishing a by-pass connection between the two shafts around said clutch element on the drive shaft, including a second clutch element driven by the drive shaft, said second clutch element being disposed in radially spaced relation to the cylinder cup, and a co-operating element associated with the second clutch element and arranged to be axially movable to and from a clutching zone at which radial clutching and de-clutching action may be effected by the second clutch element; and means responsive to synchronous conditions in the by-pass connection for controlling the completion of that connection.

42. In combination in an automotive vehicle, a drive shaft; a driven shaft co-axial therewith; a clutch element consisting of a cylinder cup secured to the driven shaft; a clutch element on the drive shaft and disposed to clutch the inside of the cup for power drive; and means for establishing bi-directional drive connections between the two shafts, including the driven clutch element cylinder cup and a second clutch element driven by the drive shaft, said second clutch element being disposed in radially spaced relation to the cylinder cup and effective radially to clutch said cylinder cup; an element cooperating with one of said clutch elements to transmit energy between the two shafts, said cooperating element being axially movable to and from a clutching zone at which radial clutching and de-clutching action may be established by the second clutch element to transmit energy between the second clutch element and the driven cylinder cup; and means operable by the operator of the vehicle for shifting the cooperating element to and from the clutching permitting position.

43. In combination in an automotive vehicle, a drive shaft; a driven shaft co-axial therewith; a clutch element consisting of a cylinder cup secured to the driven shaft; a clutch element on the drive shaft and disposed to clutch the inside of the cup for power drive; and means for establishing bi-directional drive connections between the two shafts, including the driven clutch cylinder cup; a second clutch element driven by the drive shaft and including means operative automatically to detect synchronous conditions between said second clutch element and the driven clutch cup, and also operative automatically at that time to radially clutch the driven clutch cup; and means operative by the operator of the vehicle to shift one of said clutch elements axially to the clutching zone, at which the second clutch element may radially clutch and declutch the driven clutch cup.

AUGUST J. MOTTLAU.